| United States Patent [19] | [11] | 4,056,146 |
|---|---|---|
| Hall | [45] | Nov. 1, 1977 |

[54] METHOD FOR DISSOLVING CLAY

[75] Inventor: Bobby E. Hall, Duncan, Okla.

[73] Assignee: Halliburton Company, Duncan, Okla.

[21] Appl. No.: 702,813

[22] Filed: July 6, 1976

[51] Int. Cl.$^2$ .............................................. E21B 43/27
[52] U.S. Cl. .................................. 166/300; 166/307; 423/132
[58] Field of Search ............... 166/270, 271, 281, 300, 166/305 R, 307; 175/64; 299/5; 423/116, 132; 75/1; 252/8.55 B, 8.55 C

[56] References Cited

U.S. PATENT DOCUMENTS

| 1,480,928 | 1/1924 | Bishop | 423/132 X |
|---|---|---|---|
| 1,990,969 | 2/1935 | Wilson | 166/300 |
| 2,094,479 | 9/1937 | Vandergrift | 252/8.55 C |
| 2,466,674 | 4/1949 | Mullady | 252/8.55 C |
| 2,782,859 | 2/1957 | Garst | 166/305 R |
| 2,885,004 | 5/1959 | Perry | 166/307 |
| 3,025,911 | 3/1962 | Bergman | 166/305 R |
| 3,483,923 | 12/1969 | Darley | 166/271 |
| 3,543,856 | 12/1970 | Knox et al. | 166/307 X |
| 3,707,192 | 12/1972 | Goins, Jr. et al. | 166/300 |
| 3,828,854 | 8/1974 | Templeton et al. | 166/307 |

OTHER PUBLICATIONS

Van Poollen, "How Acids Work in Stimulating Production and Injection Wells," Oil and Gas Journal, Sept. 11, 1967, pp. 93–98.

Primary Examiner—Stephen J. Novosad
Assistant Examiner—George A. Suchfield
Attorney, Agent, or Firm—Thomas R. Weaver; John H. Tregoning

[57] ABSTRACT

A method for dissolving clay is disclosed which comprises contacting the clay, in alteration, with separate slugs of a hydrogen ion-containing chemical and a fluoride ion-containing chemical. The hydrogen ions and fluoride ions react on the surface of the clay to produce hydrofluoric acid to dissolve the clay. The method is particularly valuable in dissolving the clay in a mixture of sand and clay without dissolving the sand. This finds immediate value in the practice of acid treating subterranean sandstone formations to increase permeability or to restore permeability damaged by clay.

15 Claims, No Drawings

METHOD FOR DISSOLVING CLAY

It is well known that hydrofluoric acid rapidly dissolves silica, clay and mixtures of silica and clay. This knowledge has been utilized in the treatment of subterranean formations containing silica and clay to increase the permeability of such formations whereby the ability of fluids, such as oil, gas and water, to flow through the thus treated formations is enhanced. This practice, known in the relevant art as sandstone acidizing, involves the use of hydrofluoric acid, sometimes in combination with and sometimes in series with other acids, to treat subterranean formations principally comprised of silica and clay.

In a sandstone formation, which for purposes of this disclosure is one which is principally comprised of silica and clay and which may also contain calcareous constituents, the clay components thereof can interfere with movement of fluid through the formation to, for example, a well bore. The interference can be due to clay particles which are caused by the moving fluid to migrate into and plug the passages of the formation to thereby severely reduce the formation permeability. This is referred to herein as clay damage. Clay damage can also be caused by clay which swells upon contact with foreign liquids. This swelling, like the migrating particles, can also result in reducing the permeability of a formation.

Thus, one of the principal uses of hydrofluoric acid in sandstone acidizing is for the purpose of dissolving clay to increase or to otherwise restore lost permeability; however, due to the fact that hydrofluoric acid dissolves both clay and sand, it is difficult to dissolve only the clay component.

Furthermore, since hydrofluoric acid reacts very rapidly with both sand and clay it is thought that deep clay damage, that is clay damage not in the immediate vicinity of a well bore, is not contacted with active hydrofluoric acid, but only with spent acid, and therefore the offending clay particles are not dissolved. Many persons skilled in the art of well acidizing believe that deep clay damage in a sandstone formation begins as close as one to two feet from the well bore.

In addition to the above problems, it is usually not desired to dissolve silica at all, since the silica is ordinarily not involved in permeability reduction. Since the quantity of silica in a sandstone formation is ordinarily many times greater than the quantity of clay in a sandstone formation, it is not practical by known methods to attempt to remove deep clay damage for this would require large volumes of hydrofluoric acid to dissolve substantially all the silica to enable contact of the deep clay damage with active acid.

The art thus lacks a reliable method for contacting sandstone formations with sufficient active hydrofluoric acid to effectively remove clay damage, including deep clay damage, while avoiding the undesirable dissolution of silica. This invention provides such a method.

There are several references herein to clay. Thus, for purposes of this invention, clay is a hydrated aluminum silicate having the general formula $Al_2O_3SiO_2.nH_2O$. Clay types include kaolinite, montmorillonite, attapulgite, illite, bentonite, halloysite, mixed-layer, chlorite and mixtures thereof.

By this invention the clay components of a sandstone formation are rendered highly susceptible to attack by hydrofluoric acid. In fact, it has been observed by laboratory experiments that hydrofluoric acid preferentially dissolves clay in mixtures of sand and clay when the mixture is treated in accordance with the method of this invention which features the formation of the active hydrofluoric acid within the sand-clay mixture itself.

The method of this invention employs two primary mechanisms to produce hydrofluoric acid on the surface of the clay components within a mixture of sand and clay, such as a sandstone formation. Thus the acid, as it forms, immediately reacts with and spends on the clay with the result that very little active acid, if any, actually comes into reactive contact with silica.

Accordingly, the clay component is dissolved while very little of the silica component, if any, is dissolved.

The mechanisms referred to above are these:

Hydrofluoric acid is rapidly produced when a source of hydrogen ions is placed in contact with a source of fluoride ions. Thus, for example, hydrochloric acid reacts with ammonium bifluoride to produce hydrofluoric acid. The second mechanism is that clay readily enters into ion exchange relationship with a hydrogen donor whereby hydrogen ions become attached to the clay surface, and clay also readily enters into ion exchange relationship with a fluoride donor whereby fluoride ions become attached to the clay surface.

Thus, according to the method of this invention, a mixture of sand and clay is contacted with a first chemical source of either hydrogen ions or fluoride ions. The first source, upon contact with the clay component of the sandclay mixture, donates an ion (hydrogen or fluoride but not both) to the surface of the clay. Thereafter the mixture of sand and clay is contacted with a second chemical source of either hydrogen ions, if the first source contained fluoride ions, or fluoride ions, if the first source contained hydrogen ions. Accordingly, when the second chemical source contacts a clay particle, having an ion donated by the first source on its surface, hydrofluoric acid immediately forms on the surface of the clay and dissolves the clay. The sequence of a first chemical source followed by a second chemical source is referred to herein as a stage.

By this mechanism very little, if any, active hydrofluoric acid is available for reactive contact with sand; therefore, very little, if any, sand is dissolved.

The process of the invention is further exemplified by the examples below.

EXAMPLE I

Laboratory tests were performed on mixtures of sand and clay utilizing different solvent systems.

Solvent System 1 was a single aqueous solution consisting of 3.0% by weight hydrofluoric acid and 12.0% by weight hydrochloric acid.

Solvent System 2 consisted of two solutions, one being a 7.5% by weight aqueous hydrochloric acid solution, the second being a 5.6% by weight aqueous ammonium fluoride solution which had been adjusted to a pH of 8 with ammonium hydroxide.

Solvent System 3 consisted of two solutions, one being a 7.5% by weight aqueous hydrochloric acid solution, the second being a 2.8% by weight aqueous ammonium fluoride solution which had been adjusted to a pH of 8 with ammonium hydroxide.

Each of solvent systems 1, 2 and 3 was flowed through separate, but identical, mixtures of sand and clay. Each such mixture consisted of a uniform blend of 1187.5 grams of 70–170 mesh (U.S. Sieve Series) silicon dioxide (sand) and 62.5 grams of bentonite clay (95% sand — 5% clay). Each sand-clay mixture was placed in a cylinder having an inside diameter of one inch and the mixtures occupied a length of five feet of each cylinder.

Each sand-clay column was pretreated with 1-pore volume of a 3% by weight aqueous solution of ammonium chloride. After placing the 1-pore volume of ammonium chloride in the sand-clay column, a soak period of at least 24 hours was allowed prior to further treatment. 1-pore volume was about 245 cc. Pore volume was determined by pouring a known volume of the ammonium chloride solution through the column and measuring the volume of solution escaping the column, with the difference between the two (the amount retained in the mixture) being 1-pore volume.

After the 24-hour soak period, 400 cc of the 3% by weight aqueous ammonium chloride was passed through the column under an applied pressure of 20 psig while noting the flow rate of the solution through the column which was about 1.1 cc/min.

The permeability can be calculated utilizing Darcy's equation for flow through porous media:

$$k = Q\mu L/\Delta PA \tag{1}$$

wherein $k$ is permeability,
$Q$ is flow rate,
$\mu$ is viscosity,
$L$ is length of flow path,
$\Delta P$ is pressure drop across $L$, and
$A$ is cross sectional area of flow path.

Each solvent system was then passed through one of the sand-clay columns. One thousand cc of solvent system 1 was utilized and 2,000 cc of each of solvent systems 2 and 3 were utilized. Solvent system 2 consisted of 1000 cc of the hydrochloric acid component and 1000 cc of the ammonium fluoride component, and solvent system 3 also consisted of 1000 cc of the hydrochloric acid component and 1000 cc of the ammonium fluoride component.

It is noted that 2000 cc of solvent system 2 provided the same total fluoride ion concentration as provided by solvent system 1, and 2000 cc of solvent system 3 provided one half the total fluoride ion concentration as provided by solvent system 1.

All of each solvent system was passed through its respective sand-clay column under an applied pressure of 20 psig.

During the test runs involving solvent systems 2 and 3, the acid and fluoride sources of each were passed through the columns in alternate 100 cc slugs wherein an acid source was employed first. Thus, 10 slugs of hydrochloric acid and 10 slugs of ammonium fluoride were used during the tests involving solvent systems 2 and 3. Accordingly, these tests were 10-stage treatments.

Approximately 4 pore volumes of Solvent System 1 (1000 cc) and approximately 8 pore volumes of each of Solvent Systems 2 and 3 (2000 cc's each) were utilized.

After each solvent system was passed through its respective column, the column was washed by passing 400 cc of a 3% by weight aqueous ammonium chloride solution through the column under an applied pressure of 20 psig. The flow rate through each column was measured to enable the permeability thereof, which is referred to as the final permeability ($k$), to be calculated utilizing formula (1). The flow rates of the ammonium chloride through the sand-clay column treated with Solvent System 1 was 1.2 cc/min; Solvent System 2, 1.7 cc/min; and Solvent System 3, 1.9 cc/min.

The results reported in Column D of Table I, below, include the ratio $k$ to $k_o$. This permeability ratio was actually determined by dividing final flow, $Q$, by initial flow rate, $Q_o$. Examination of equation (1), above, indicates that dividing $k$ by $k_o$ equals $Q/Q_o$, since the remaining terms, being constant, cancel out.

The change in permeability of each sand-clay column between the initial permeability, $k_o$, and the final permeability, $k$, is reported in Column D, Table I, below, as a ratio of final permeability to initial permeability, $k/k_o$. Thus, a permeability ratio having a value of less than 1 indicates a decrease in permeability, a value equal to 1 indicates no change in permeability and a value of greater than 1 indicates an increase in permeability.

The spent solvent solutions passing through each column were collected and analyzed for total dissolved silica and total dissolved aluminum. The results are presented in Columns C of Table I, below.

Upon the conclusion of the solvent tests, each of the three sand-clay columns was divided into five equal one-foot lengths, to thus produce 15 1-foot long samples. The samples were then dried in an oven. Thereafter, 5 gram portions of each sample were treated with 100 cc of a solution consisting of 3% by weight hydrofluoric acid and 12% by weight hydrochloric acid for 5 minutes. The treated portions were then filtered, the solids collected, dried and weighed. The weight difference due to the reaction of the acid is reported in Columns E of Table I, below. Columns E are arranged to indicate the weight loss in the total sand-clay column in terms of feet from the point in which the solvent systems were introduced into the sand-clay columns.

TABLE I

FIVE FOOT SAND-CLAY COLUMN STUDIES OF SOLVENT SYSTEMS

| A | B | C | | D | E | | | | |
|---|---|---|---|---|---|---|---|---|---|
| A Solvent System | B Content | Total Silica and Aluminum Dissolved by Solvent, Grams | | Permeability Ratio | Material Dissolved by 3% HF - 12% HCl Solution from Column Samples Previously Treated by Solvent System, Grams | | | | |
| | | Silica | Aluminum | k/ko | 1 Ft | 2 Ft | 3 Ft | 4 Ft | 5 Ft |
| 1 | 1000 cc 3% HF - 12% HCl | 7 | 4.4 | 1.09 | 0.00 | 0.05 | 0.2 | 0.21 | 0.225 |
| 2 | 1000 cc, 7½% HCl 1000 cc, 5.6% NH₄F | 1.9 | 1.4 | 1.55 | 0.19 | 0.205 | 0.215 | 0.24 | 0.225 |
| 3 | 1000 cc, 7½% HCl 1000 cc, 2.8% NH₄F | 2.2 | 1.8 | 1.73 | 0.16 | 0.14 | 0.16 | 0.15 | 0.14 |

Referring to Table I it can be seen that all three solvent systems produced an increase in permeability as all ratios in Column D are greater than 1. However, Solvent System 1, which is an example of the well known use of hydraulic acid in sandstone acidizing, produced lesser increase in permeability than did Solvent Systems 2 and 3, which are examples of the invention herein. In this regard, recall that Solvent System 1 and Solvent System 2 provided equal fluoride ion concentrations while Solvent System 3 provided a fluorine concentration equal to one-half that provided by Solvent System 1.

Columns C of Table I indicate that Solvent System 1 dissolved much more silica and aluminum that did either of Solvent Systems 2 or 3, taken singly or in combination, but Column D shows that the solvent power of Systems 2 and 3 had a much greater beneficial impact on average permeability increase than did Solvent System 1.

Columns E indicate that the effect of Solvent System 1 to dissolve the contents of the sand-clay mixture decreased with distance from the point of introduction of the solvent system. The 1-foot and 2-foot samples of Solvent System 1 suggest that Solvent System 1 dissolved substantially all of the clay content of the sand-clay mixture capable of being attacked by hydrofluoric acid within two feet of the point of introduction and that the ability to dissolve the clay component diminished considerably in the 3-foot, 4-foot and 5-foot samples.

Columns E also indicate that the method of this invention, as seen in Solvent Systems 2 and 3, retained good ability to dissolve the clay component of the sand-clay mixture at each of the 1-foot, 2-foot, 3-foot, 4-foot and 5-foot distances from the point of introduction of the solvent systems.

Thus the method of this invention exhibits greater efficiency in hydrofluoric acid treating of sand-clay mixtures to improve the average permeability of the mixture than does the method practiced in the prior art.

EXAMPLE II

A test material, being either sand or clay, was contacted by successive solvent solutions to determine the quantity of silica and aluminum dissolved by the solutions. The results are reported in Table II, below, as milligrams of silica or aluminum dissolved per liter of solvent solution (Mg/L).

In runs 1-9, inclusive, the test material was 70-170 mesh (U.S. Sieve Series) sand. In runs 1-4, Solution 1 was an acid and Solution 2 was ammonium fluoride ($NH_4F$) which contained a sufficient quantity of ammonium hydroxide ($NH_4OH$) to adjust the pH of the $NH_4F$ to a value of 8.

In runs 5-8, Solution 1 was $NH_4F$, having an $NH_4OH$ adjusted pH value of 8, and Solution 2 was an acid.

In run 9, Solution 1 was an aqueous acid consisting of 3% by weight HF and 12% by weight HCl. There was no Solution 2 utilized in run 9.

In runs 10-18, inclusive, the test material was clay, specifically bentonite G-1, a Wyoming bentonite. In runs 10-3, Solutions 1 and 2 were the same as utilized in runs 1-4. In runs 14-17, Solutions 1 and 2 were the same as utilized in runs 5-8. In run 18, Solution 1 was the same as utilized in run 9 and no Solution 2 was utilized in run 18.

With the exception of the solution utilized in runs 9 and 18, the acids were aqueous solutions containing 7.5% by weight of one of HCl, $HNO_3$, $H_2SO_4$ or $H_3PO_4$. The ammonium fluoride utilized was an aqueous solution containing 2.8% by weight $NH_4F$.

The test procedure utilized is set out below:
1. Place 1 gram (1000 mg) of test material into a plastic beaker.
2. Pour 100 milliliters of Solution 1 into the beaker.
3. Allow the mixture of Solution 1 and test material to stand for 24 hours with occasional agitation.
4. Filter the mixture through acid-washed filter paper (Whatman No. 50 for sand; 35 micron millipore for clay).
5. Analyze the filtrate portion of Step 4 for silica and aluminum.
6. Wash the solid portion of Step 4 with two hundred milliliters of distilled water.
7. Dry the washed solid from Step 6, weigh it, and then place it into a second plastic beaker.
8. Pour an amount of solution 2 into the second beaker equal to 1 milliliter of Solution 2 per each 10 mg of solid.
9. Allow the mixture of Solution 2 and solid to stand for 24 hours with occasional agitation.
10. Filter the mixture as in Step 4 and analyze the filtrate for silica and aluminum.

NOTE: Steps 6 – 10 are eliminated for runs 9 and 18.

TABLE II

| RUN | TEST MATERIAL 1000 mg | SOLUTION 1, 100 ml | SOLUTION 2, 1 ml/10dmg REMAINING TEST MATERIAL | TOTAL TEST MATERIAL DISSOLVED BY SOLUTIONS 1 AND 2, MG/L | |
|---|---|---|---|---|---|
| | | | | Silica ($SiO_2$) | Aluminum (Al) |
| 1 | SAND | HCl | $NH_4F$ | 13.9 | 0.0 |
| 2 | SAND | $HNO_3$ | $NH_4F$ | 15.0 | 0.0 |
| 3 | SAND | $H_2SO_4$ | $NH_4F$ | 10.4 | 0.0 |
| 4 | SAND | $H_3PO_4$ | $NH_4F$ | 9.5 | 0.0 |
| 5 | SAND | $NH_4F$ | HCl | 21.0 | 0.0 |
| 6 | SAND | $NH_4F$ | $HNO_3$ | 17.2 | 0.0 |
| 7 | SAND | $NH_4F$ | $H_2SO_4$ | 16.5 | 0.0 |
| 8 | SAND | $NH_4F$ | $H_3PO_4$ | 16.0 | 0.0 |
| 9 | SAND | HF - HCl | — | 8370.0 | 11.5 |
| 10 | CLAY | HCl | $NH_4F$ | 103 | 30.5 |
| 11 | CLAY | $HNO_3$ | $NH_4F$ | 92 | 28.7 |
| 12 | CLAY | $H_2SO_4$ | $NH_4F$ | 99 | 31.2 |
| 13 | CLAY | $H_3PO_4$ | $NH_4F$ | 144 | 31.7 |
| 14 | CLAY | $NH_4F$ | HCl | 165 | 105.7 |
| 15 | CLAY | $NH_4F$ | $HNO_3$ | 197 | 95.5 |
| 16 | CLAY | $NH_4F$ | $H_2SO_4$ | 175 | 83.7 |
| 17 | CLAY | $NH_4F$ | $H_3PO_4$ | 310 | 75.5 |
| 18 | CLAY | HF - HCl | — | 3500.0 | 890.0 |

Referring to Table II, which illustrates the method provided by this invention to dissolve clay by treating it with alternate slugs of a hydrogen ion source and a fluoride ion source, it is noted that sand and clay are both readily dissolved by treatment with hydrofluoric acid. In this connection, run 9, which involved sand, indicates that 8370 mg of silica per liter of hydrofluoric acid solution and 11.5 mg of aluminum per liter of hydrofluoric acid solution were dissolved with the hydrofluoric acid solution, and run 18, which involved clay, indicates that 3500 mg of silica and 890 mg of aluminum per liter of hydrofluoric acid solution were dissolved with the hydrofluroic acid solution.

In contrast, when sand was treated in accordance with this invention (runs 1-8) very little material was dissolved indicating that hydrofluoric acid was not formed in the sand. In comparison, when the clay was treated in accordance with this invention (runs 10-17), the quantity of dissolved material indicated that hydrofluoric acid was formed in the clay. The clay was thus rendered highly susceptible to hydrofluoric acid attack and dissolution of sand was minimized by the method of the invention.

Analysis of the silica dissolution results shown in Table II indicates that about 21 to 29 times more clay was dissolved by the method of this invention than was sand. Furthermore, Table II indicates that clay can be dissolved by the method of this invention regardless of whether the first chemical source contains hydrogen ions or fluoride ions, although better laboratory dissolution was obtained when a fluoride ion source preceded the hydrogen ion source.

As previously mentioned, the method of this invention comprises contacting the sand-clay mixture with alternate slugs of hydrogen ion-containing chemicals and fluoride ion-containing chemicals. As far as clay dissolution is concerned, it makes no difference whether the fluoride-ion source precedes or succeeds the hydrogen ion source, but, for reasons explained hereinafter, it is preferred that the hydrogen ion source precede the fluoride ion source.

The chemical source of hydrogen ions can be any aqueous acidic solution containing in the range of from about 0.2 to about 5, preferably 0.9 to 3, and still more preferably from about 1.4 to about 2.2 equivalent weights of hydrogen ion per liter of solution.

The preferred hydrogen ion sources are the inorganic acids such as hydrochloric acid, nitric acid, sulfuric acid and phosphoric acid with hydrochloric acid being preferred.

Table III, below, provides the approximate relationship between equivalent weights of hydrogen ion per liter of solution (normality, N) and hydrochloric acid concenration in percent by weight of solution.

TABLE III

| N | HCl Concentration % by Weight |
|---|---|
| 0.2 | 0.7 |
| 0.9 | 3.2 |
| 1.4 | 5.0 |
| 2.2 | 7.7 |
| 3.0 | 10.4 |
| 5.0 | 16.8 |

The relationship between normality and weight percent of other hydrogen ion sources can be calculated by well known methods.

The use of acids having a concentration greater than about 5 normal is not recommended because of the adverse effect such acids have on clay. Such highly concentrated acids could be used so long as contact with subsequently introduced fluoride is to be reasonably expected, for while such acids tend to flocculate clay, subsequently introduced fluoride would result in dissolution of the clay. However, it is certainly possible that all clay-containing locations in a formation, particularly those at some distance from the point of chemical introduction, could be contacted by acid but not by fluoride. In those locations, acid having concentrations greater than 5 normal, would produce clay damage which would not be removed by the method of this invention due to the possible absence of fluoride ion contact.

In addition, the use of highly concentrated acid increases such problems in oil well acidizing as emulsion formation and corrosion of downhole pipe and hardware.

The lower limit of acid is more an economic limit than a physical limit. Acids having a concentration less than 0.2 normal, would provide hydrogen ions capable of dissolving clay, but large volumes of acid having such low concentrations would be required, thus creating transportation difficulties and presenting the various problems involved in long pumping times.

The source of fluoride ions can, theoretically, be any alkali metal or alkaline earth metal fluoride or mixtures thereof; in actual practice, however, the source of fluoride ions in the practice of this invention is restricted to ammonium fluoride and/or ammonium bifluoride for the following reasons.

The reaction of an acid, such as hydrochloric acid, with an alkali metal fluoride, such as sodium fluoride, produces sodium chloride and hydrofluoric acid. The produced hydrofluoric acid then reacts with silica ($SiO_2$) to produce water and silicon tetrafluoride. The above reactions render the use of the alkali metal fluorides theoretically useful for practice of this invention. However, the formed silicon tetrafluoride reacts with hydrofluoric acid to form fluosilicic acid which, in the presence of an alkali metal, forms an insoluble alkali metal precipitate. The thus formed precipitate remains insoluble even in the presence of acid of concentrations useful in sandstone acidizing. Thus, by use of an alkali metal fluoride, clay can be dissolved, but an insoluble precipitate can be formed to take its place.

It has been observed that ammonium ion will not produce insoluble precipitates in the presence of fluosilicic acid.

As mentioned above, the alkaline earth metal fluorides, such as calcium fluoride, are also theoretical sources of fluoride ion. However, alkaline earth metal fluorides themselves are insoluble except in the presence of highly concentrated acid. In view of the discussion given above with respect to the undesirable presence of acids having high concentrations, the use of alkaline earth metal fluorides as a source of fluoride ion is not desirable.

The formation of insoluble precipitates in the presence of the ammonium ion in the practice of this invention has not been observed.

In sandstone acidizing, a sandstone formation contains calcareous constituents, which would include alkaline earth metals, such as calcium and magnesium. Water containing alkali metal salts such as sodium chloride and/or potassium chloride would also be present in sandstone formations. Thus, in view of the above discussion, there is a possibility of forming undesirable secondary precipitates, while acidizing sandstone utilizing the process of this invention. Accordingly, steps are preferably taken to isolate the potential precipitate-forming constituents of sandstone from the fluoride ion-containing chemical sources. Thus, a preflush material is utilized to form a barrier between alkali metal-containing water and fluoride-containing chemical sources. Such a barrier material can be ammonium chloride. In those situations where the sandstone contains calcareous constituents, the preflush can be hydrochloric acid which would dissolve the alkaline earth metal components of the calcareous materials and remove them from the portion of the formation to be treated by the method of this invention prior to the introduction of fluoride-containing chemicals. When the barriers have been introduced, the actual alternate introduction of hydrogen ion sources and fluoride ion sources can be started. It is believed that three to ten slugs of each of the separate hydrogen ion and fluoride ion sources is sufficient to produce active hydrofluoric acid at distances of up to about five feet from the point of introduction, which, of course, is usually the well bore.

The concentration of fluoride ion useful herein is substantially the same as that given above for the concentration of hydrogen ion. Thus ammonium fluoride and/or ammonium bifluoride containing in the range of from about 0.2 to about 5, preferably 0.3 to 3, and still more preferably from about 0.7 to about 2.0, equivalent weights of fluoride ion per liter of solution is useful. The currently preferred fluoride ion source is an aqueous solution of ammonium fluoride having a concentration of about 2.8 percent by weight of solution (0.76 N).

In use of the method of this invention for treating sandstone formations, it is preferred that the concentrations of fluoride ion be stoichiometrically equivalent to the hydrogen ion concentration or slightly less. That is, an excess of hydrogen ions with respect to fluoride ions is preferred. It is believed that an excess of fluoride ions would tend to produce the insoluble precipitates, referred to previously, due to the probable presence of alkali metals and alkaline earth metals in sandstone formations.

The purpose of the invention is to produce hydrofluoric acid on the surfaces of clay particles within a mixture comprised of sand and clay whereby the clay does dissolve but the sand does not dissolve. Thus, steps should be taken to prevent or at least to minimize the contact of hydrogen ions and fluoride ions at locations other than on the clay surfaces. Thus, when the chemical source of fluoride ion, i.e. ammonium fluoride or ammonium bifluoride, is introduced into a mixture of sand and clay, the pH of the source is adjusted with ammonium hydroxide to at least a neutral value and preferably a slightly basic value, 7 to 8, to assure the absence of hydrogen ions which could result in the premature formation of hydrofluoric acid.

Also, during the alternate introduction of the hydrogen ion source and the fluoride ion source in the practice of this invention is sandstone acidizing, interface mixing of the sources in the well bore can be minimized by maintaining the chemicals in turbulent flow. The concept of liquids in turbulent flow is well known and is thus beyond the scope of this disclosure. Recourse to standard references such as Perry's *Chemical Engineer's Handbook* should be made for further discussion of this point.

Interface mixing can also be minimized or avoided by placing a suitable spacer material between each slug. Such a suitable spacer is ammonium chloride.

The distance into a formation that hydrofluoric acid can be generated according to the process of this invention is a function of the depth of penetration of each slug of hydrogen ion source and each slug of fluoride ion source. The amount of interface mixing, as referred to above, in the formation and well bore also can diminish the desired hydrofluoric acid formation on clay surfaces deep in a formation; however, it is believed that the method of this invention can result in the production of hydrofluoric acid on clay at distances of about 5 to about 5½ feet from a well bore into a formation.

The method of this invention comprising the alternate introduction of hydrogen ion sources and fluoride ion sources into sandstone formations can be preceded by preflush chemicals and succeeded by overflush chemicals.

Preflush and overflush chemicals useful can be hydrochloric acid, combinations of hydrofluoric acid and hydrochloric acid, and ammonium chloride. Also useful as preflush and overflush material are aliphatic and aromatic hydrocarbons, such as crude oil, kerosene, diesel oil, xylene and the like. In two preferred embodiments, sandstone formations can be treated by contacting the formations according to the following schedules:

A.

| ORDER OF SEQUENCE | % by Weight | | QUANTITY gallons per vertical foot of formation |
|---|---|---|---|
| 1 | HCl | 5% | 100 |
| 2 | HF 3% - HCl | 12% | 50 |
| 3* a | NH$_4$F | 3% | 25 |
| b | HCl | 5% | 25 |
| 4 | Repeat step 3 at least 2 times | | |
| 5 | HCl | 5% | 100 |
| | or | | |
| | NH$_4$Cl | 3% | |

B.

| ORDER OF SEQUENCE | CHEMICAL % by Weight | | QUANTITY gallons per vertical foot of formation |
|---|---|---|---|
| 1 | HCl | 5% | 100 |
| 2* a | NH$_4$F | 3% | 25 |
| b | HCl | 5% | 25 |
| 3 | Repeat step 2 at least 2 times | | |
| 4 | HF 3% - HCl | 12% | 50 |
| 5 | HCl | 5% | 50 |
| | or | | |
| | NH$_4$Cl | 3% | |

*Steps 3a and 3b, of Schedule A, and steps 2a and 2b of Schedule B, include one stage in the process of this invention. Six stages are preferred.

As mentioned previously, turbulent flow in the well conduits should be achieved to minimize interface mixing of the chemicals. However, in achieving turbulent flow, the injection pressures utilized should not be sufficient to create formation fractures as matrix treating is required in order to treat clay damaged permeability.

The process of this invention can include non-emulsifying agents, acid corrosion inhibitors, surfactants, mutual solvents, anti-sludge agents and any other chemical or material ordinarily employed in the matrix acid treatment of sub-surface formations.

This invention is not limited to the above described specific embodiments thereof; it must be understood therefore that the detail involved in the descriptions of the specific embodiments is presented for the purpose of illustration only, and that reasonable variations and modifications, which will be apparent to those skilled in the art, can be made in this invention without departing from the spirit or scope thereof.

Having thus described the invention, that which is claimed is:

1. A method of dissolving clay comprising treating said clay with at least a one-stage treatment of at least two different chemicals, in alternate slugs, said one stage being comprised of contacting said clay with a slug of a first chemical and thereafter contacting said clay with a slug of a second chemical different from said first chemical to thereby form hydrofluoric acid on the surface of said clay, wherein said first chemical supplies one of hydrogen ions or fluoride ions and said second chemical supplies fluoride ions, if hydrogen ions are supplied by said first chemical, or hydrogen ions if fluoride ions are supplied by said first chemical wherein said chemical supplying said fluoride ions is an aqueous solution of a fluoride-containing chemical selected from the group consisting of ammonium bifluoride, ammonium fluoride, and mixtures thereof.

2. The method of claim 1 wherein said fluoride chemical has a fluoride ion concentration in the range of from about 0.2N to about 5N.

3. The method of claim 2 wherein the pH of said fluoride chemical is adjusted with ammonium hydroxide to a value of at least about 7.

4. The method of claim 3 wherein said chemical supplying said hydrogen ions is an aqueous acidic solution having a hydrogen ion concentration in the range of from about 0.2N to about 5N.

5. The method of claim 4 wherein the hydrogen ion concentration is at least equal to the fluoride ion concentration.

6. The method of claim 5 wherein said aqueous acid solution is selected from hydrochloric acid, nitric acid, sulfuric acid and phosphoric acid.

7. The method of claim 6 wherein said clay is a component in a mixture of sand and clay.

8. The method of claim 7 wherein said sand and clay mixture is treated with at least two and up to 10 of said stages.

9. The method of claim 8 wherein said sand-clay mixture is a sandstone formation.

10. The method of claim 9 wherein said sandstone formation is treated with a preflush material prior to treatment of said sandstone with any of said stages wherein said preflush material is selected from hydrochloric acid, ammonium chloride and a mixture of hydrochloric acid and hydrofluoric acid.

11. The method of claim 10 wherein said sandstone formation is treated with an afterflush material after treatment of said sandstone with all of said stages wherein said overflush material is selected from hydrochloric acid, ammonium chloride, and a mixture of hydrochloric acid and hydrofluoric acid.

12. A method of acid treating a subterranean sandstone formation comprising contacting said formation with an aqueous hydrochloric acid solution containing about 5 percent hydrochloric acid by weight of solution, contacting said formation with an aqueous solution containing about 3 percent hydrofluoric acid and about 12 percent hydrochloric acid by weight of solution, contacting said formation with at least one stage of a clay dissolving system wherein said stage consists of an aqueous solution containing about 3 percent ammonium fluoride by weight of solution, followed by an aqueous solution containing about 5 percent hydrochloric acid by weight of solution and thereafter contacting said formation with a 5 percent by weight solution of hydrochloric acid or a 3 percent by weight solution of ammonium chloride.

13. The process of claim 12 wherein said sandstone formation is contacted with at least 2 and up to about 10 of said stages in succession.

14. A method of acid treating a subterranean sandstone formation comprising contacting said formation with an aqueous hydrochloric acid solution containing about 5 percent hydrochloric acid by weight of solution;

contacting said formation with at least one stage of a clay dissolving system wherein said stage consists of an aqueous solution containing about 3 percent ammonium fluoride by weight of solution, followed by an aqueous solution containing about 5 percent hydrochloric acid by weight of solution;

contacting said formation with an aqueous solution containing about 3 percent hydrofluoric acid and about 12 percent hydrochloric acid by weight of solution; and thereafter contacting said formation with a 5 percent by weight solution of hydrochloric acid or a 3 percent by weight solution of ammonium chloride.

15. The process of claim 14 wherein said sandstone formation is contacted with at least two and up to about 10 of said stages in succession.

* * * * *